United States Patent [19]

Ferrin

[11] 4,437,580
[45] Mar. 20, 1984

[54] DISPENSER FOR SKEWERED FOODS

[75] Inventor: Wayne Ferrin, Sanford, N.C.

[73] Assignee: Frieda Boosalis, Fayetteville, N.C.

[21] Appl. No.: 380,768

[22] Filed: May 21, 1982

[51] Int. Cl.³ .......................................... B65H 29/34
[52] U.S. Cl. ....................................... 221/75; 221/87
[58] Field of Search ............ 99/357, 420, 441, 443 C; 221/75, 87, 88, 89

[56] References Cited

U.S. PATENT DOCUMENTS

| | | | |
|---|---|---|---|
| 2,701,077 | 2/1955 | Palmer | 221/75 |
| 3,168,964 | 2/1965 | Davis | 221/88 |
| 3,391,633 | 12/1966 | Boosalis | 99/441 X |
| 4,034,661 | 7/1977 | Boosalis et al. | 99/420 X |
| 4,273,253 | 6/1981 | Tanaka et al. | 221/75 |

Primary Examiner—Joseph J. Rolla
Assistant Examiner—Frederick R. Handren
Attorney, Agent, or Firm—Holman & Stern

[57] ABSTRACT

The invention comprises a dispenser for sequentially dispensing a plurality of articles, including a removable dispensing cartridge for storing foods or other articles to be dispensed. The cartridge includes support for supporting the articles in spaced vertical relationship, and a guide for guiding the movement of the articles within the cartridge. The dispenser further includes a displacement actuator for displacing the stored articles from the support during the dispensing process. The dispenser is particularly adapted for dispensing skewered foodstuffs, and is especially contemplated for use in combination with a cooking apparatus of the type wherein raw food is conveyed past a cooking element by an endless conveyor.

11 Claims, 13 Drawing Figures

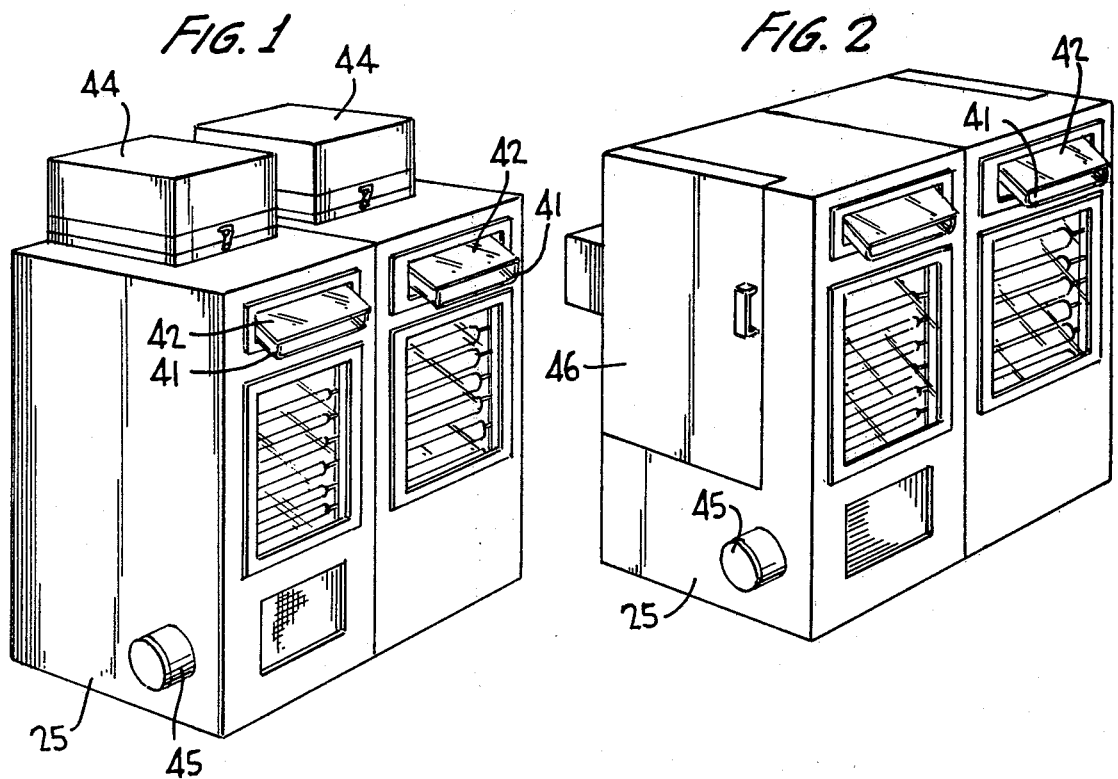
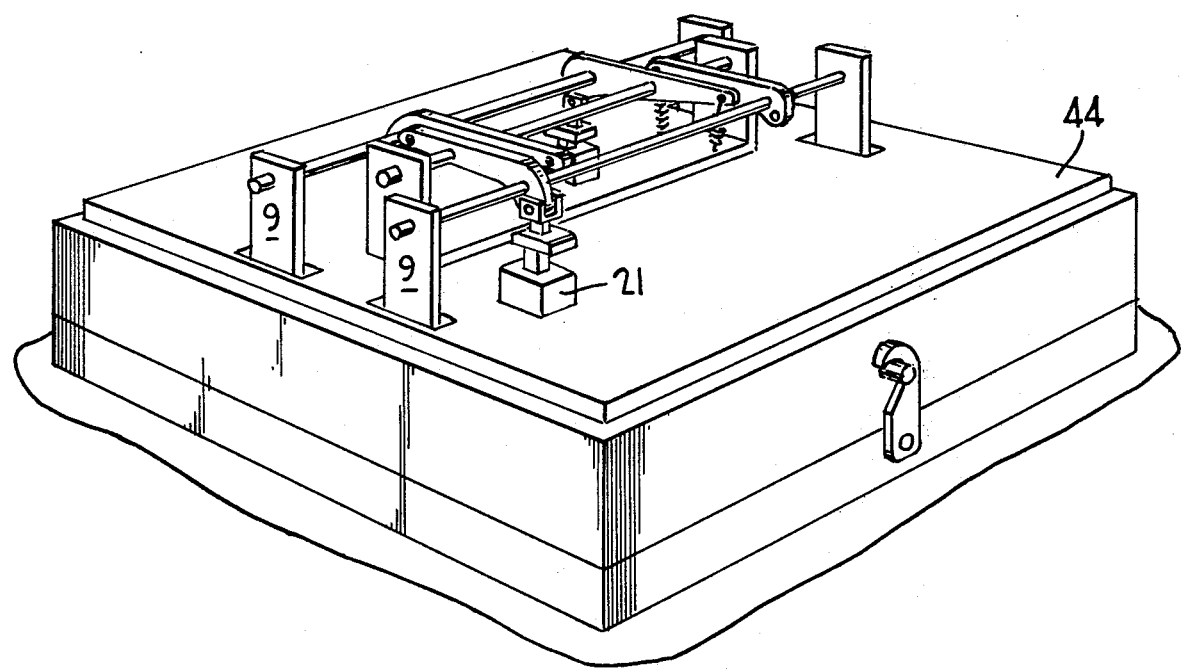

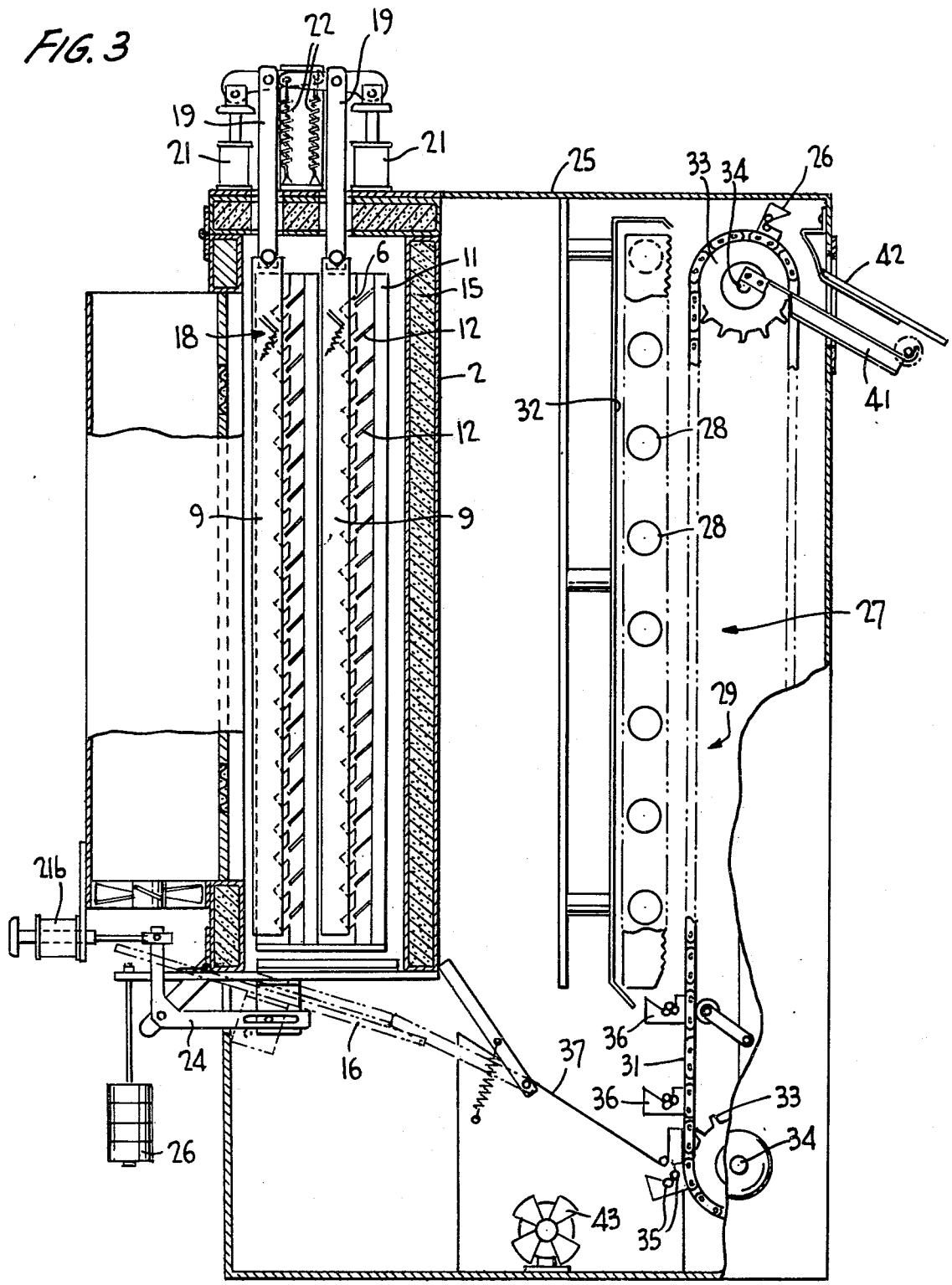

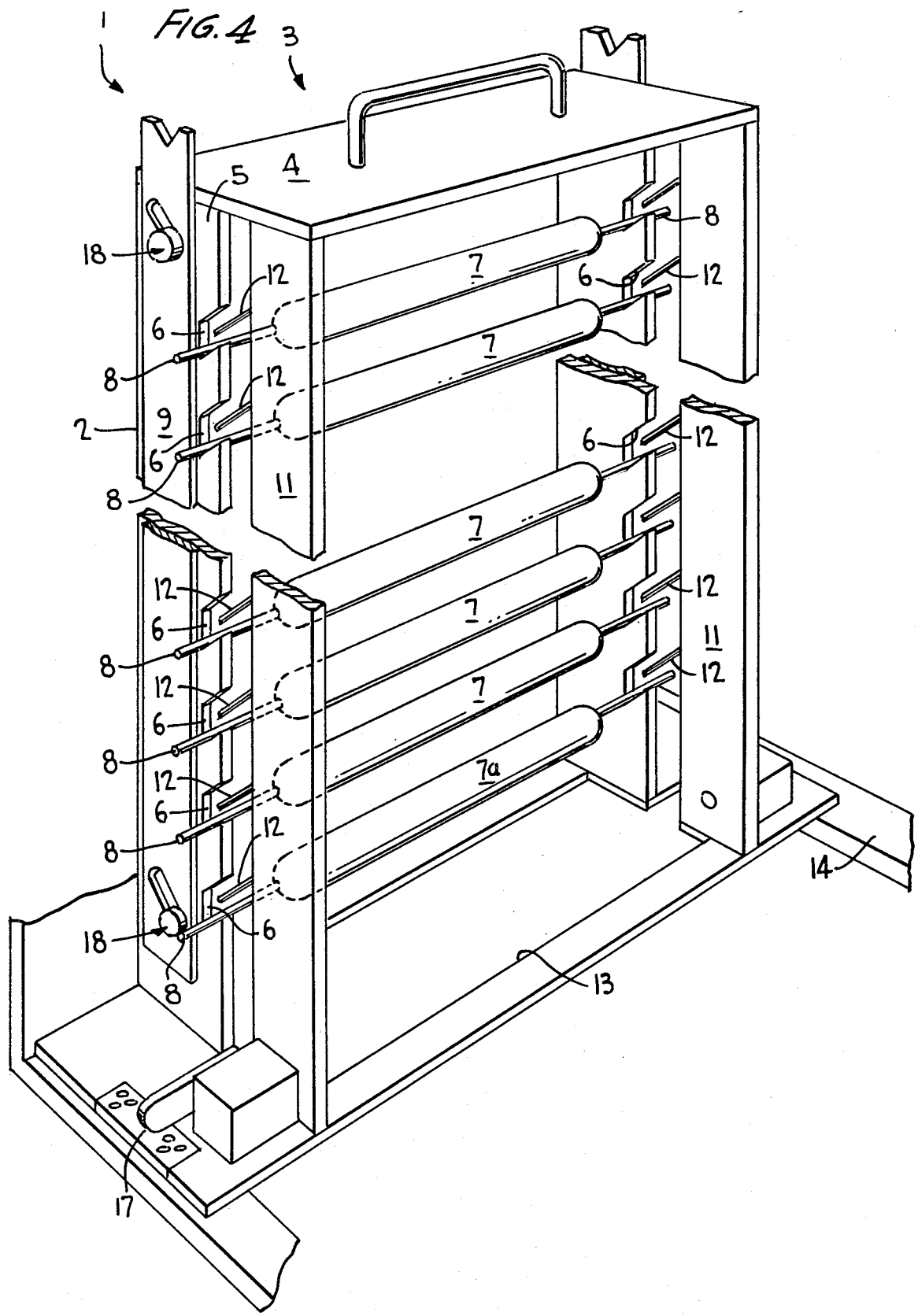

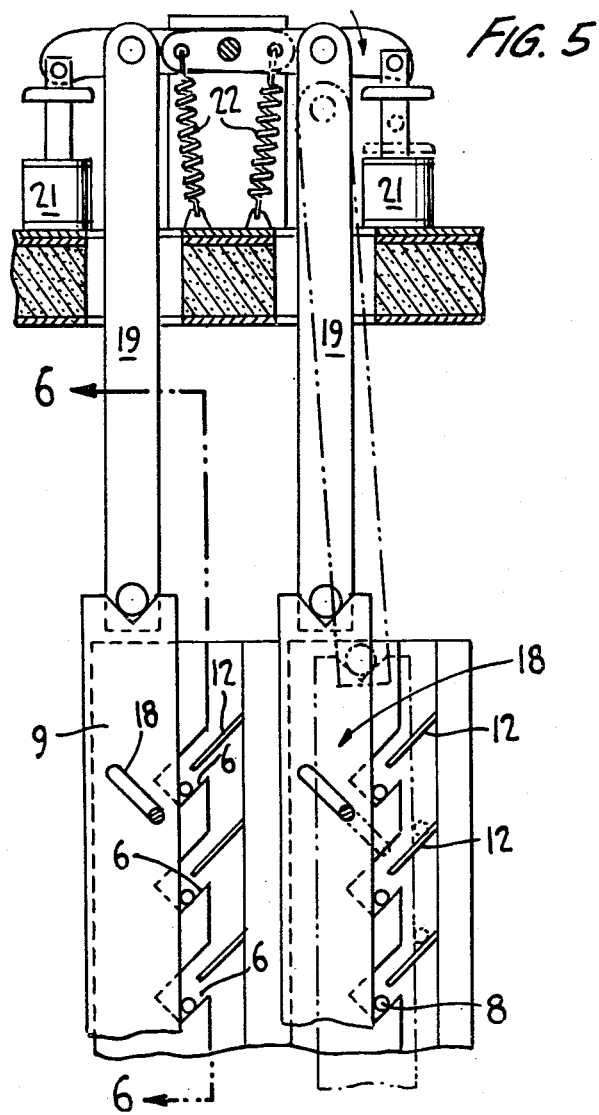
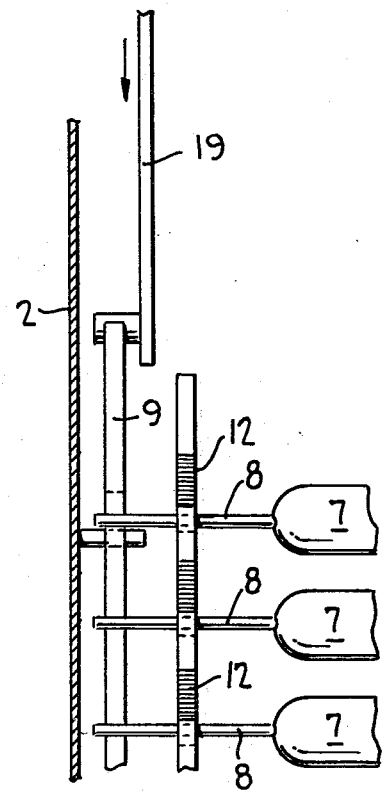
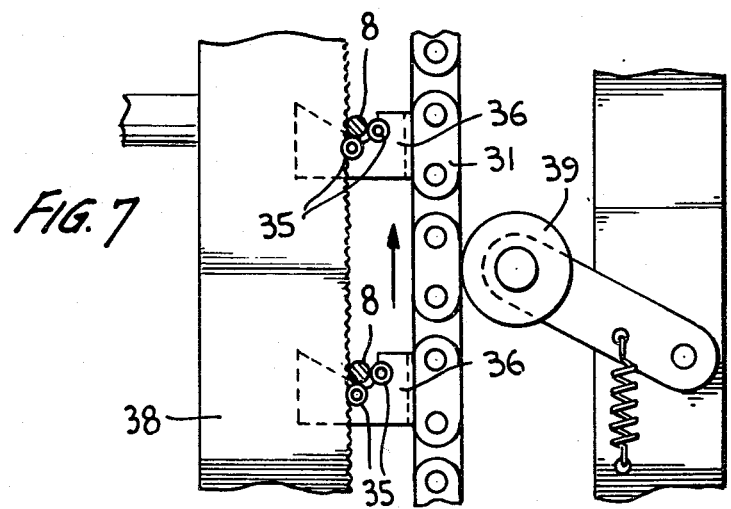

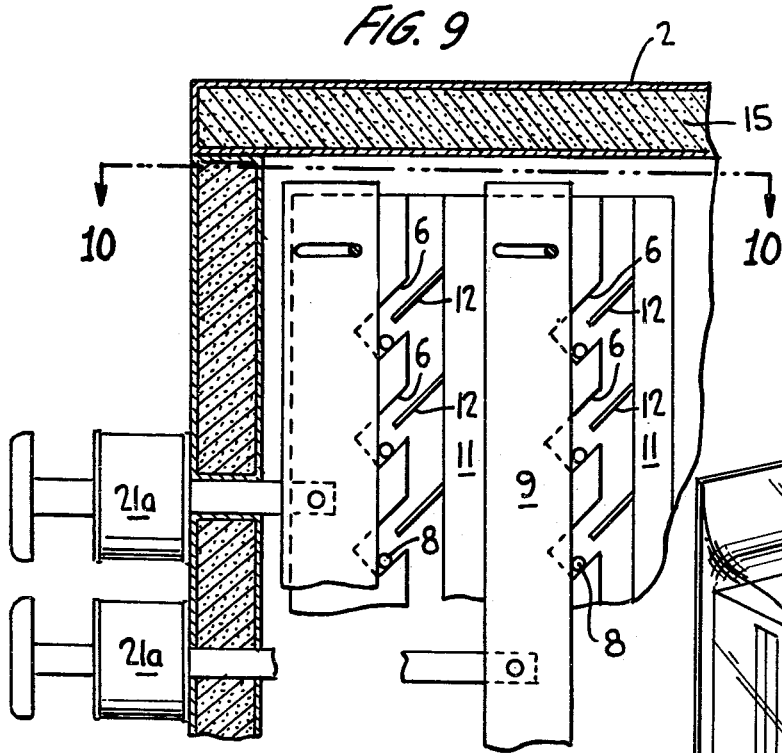
FIG. 9
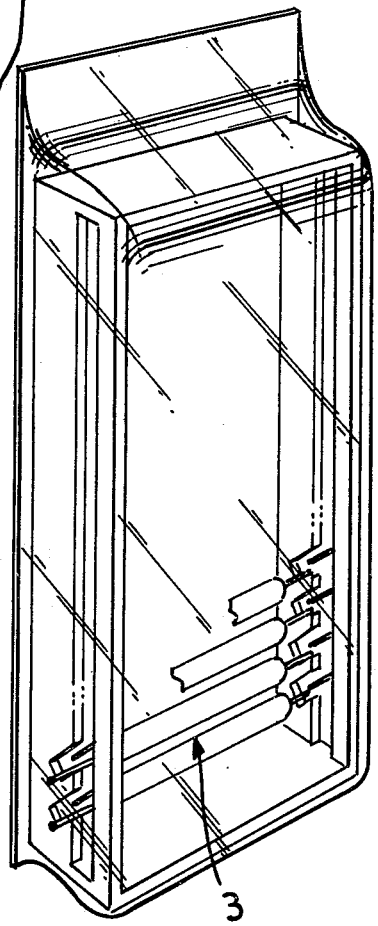
FIG. 11
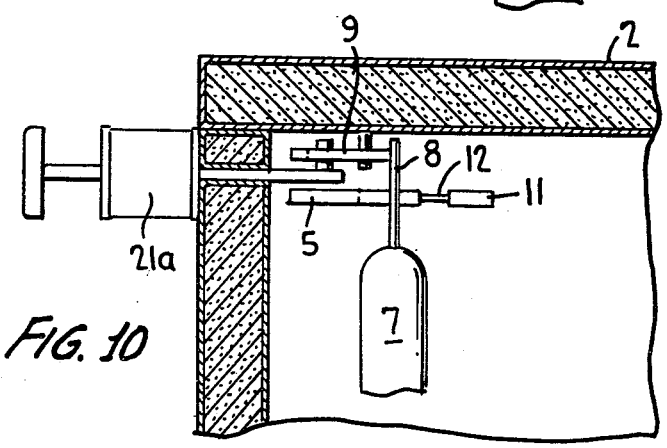
FIG. 10
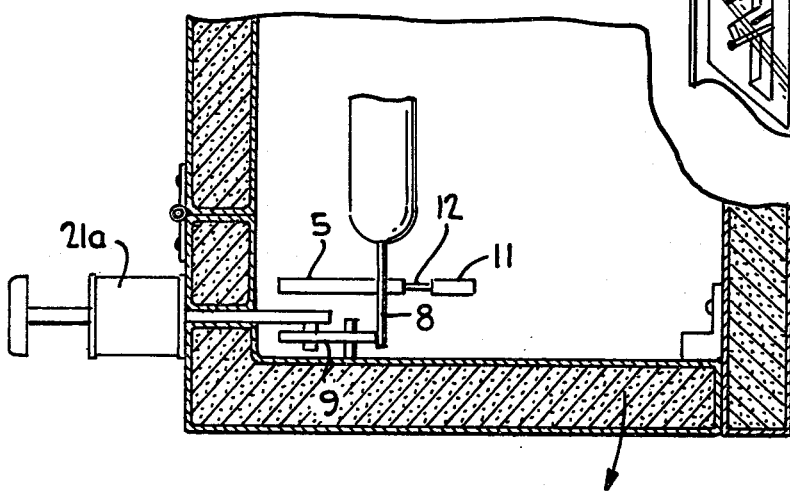

DISPENSER FOR SKEWERED FOODS

BACKGROUND OF THE INVENTION

Apparatus of the type useful for sequentially dispensing food items to be cooked to a cooking unit are well known in the art. Such apparatus have particular application in short-order vending operations, particularly coin-operated vending machines of the type employing an endless belt to convey dispensed raw food past a cooking element. Difficulties have been encountered, however, in the practical use of such apparatus, both with respect to the dispensing means and the endless belt systems employed to convey the food for cooking. Owing to the great variability in the physical characteristics of different foods, dispensing units have been typically restricted to dispensing only one type of foodstuff, characteristically hot dogs and accompanying buns. Even then, the non-uniform characteristics of the same type of foodstuff have resulted in irregular and unreliable operation of many prior art dispensers. Additionally, it has been necessary to develop specialized endless belt conveyor systems for use in conjunction with the cooking of specific foodstuffs, again owing to non-uniformity between different types of foods. Known conveyor systems for foods such as hot dogs are typically prone to result in a poorly cooked product, most usually overdone on one side and underdone on the opposite side. Frequently, it has been difficult to develop dispensing apparatus compatible with conveyor systems specifically designed for use with a certain type of foodstuff.

Accordingly, the invention provides a dispenser for both food and non-food articles, but particularly for skewered food items. Owing to the uniformity of the skewers employed, a wide variety of disparate food items can be reliably dispensed, including many food items not previously dispensible in an automated operation. Further, the dispensation of foodstuffs on skewers particularly facilitates use of the dispenser with a variety of endless conveyor means for conveying the raw food through a cooking unit.

SUMMARY OF THE INVENTION

The invention comprises a dispenser for sequentially dispensing articles, particularly skewered food items. The dispenser includes a removable dispensing cartridge for storing the articles to be dispensed, which includes means for supporting the articles within the cartridge in spaced vertical relationship and means for guiding the articles stepwise through the cartridge to a discharge outlet. The cartridge may be supplied as a filled disposable unit for use in the dispenser, or may be refillable.

The dispenser further includes means for urging the articles through the dispensing cartridge, and is advantageously employed in combination with a cooking assembly of the type employing endless conveyor means for conveying food past a series of cooking elements in a combined dispensing and cooking apparatus.

BRIEF DESCRIPTION OF THE DRAWINGS

In the Drawings:

FIG. 1 is a perspective view of a combined dispensing and cooking apparatus according to the invention;

FIG. 2 is a view similar to FIG. 1 of an alternate embodiment of the combined dispensing and cooking apparatus;

FIG. 3 is a cross-sectional side view of the combined dispensing and cooking apparatus of FIG. 1;

FIG. 4 is a perspective view of an embodiment of the dispenser of the apparatus of FIG. 3;

FIG. 5 is a partial detail of the dispenser of the apparatus of FIG. 3;

FIG. 6 is a view along the line 6—6 of FIG. 5;

FIG. 7 is a partial detail of the conveyor system of the apparatus of FIG. 3;

FIG. 9 is a cross-section partial detail of the dispenser of the apparatus of FIG. 2;

FIG. 10 is a view along the line 10—10 of FIG. 9;

FIG. 11 is a perspective view of the dispensing cartridge of the invention, packaged for sale;

FIG. 13 is a perspective view of the actuating mechanism of the apparatus of FIG. 1.

DETAILED DESCRIPTION OF THE INVENTION

Figure 8:
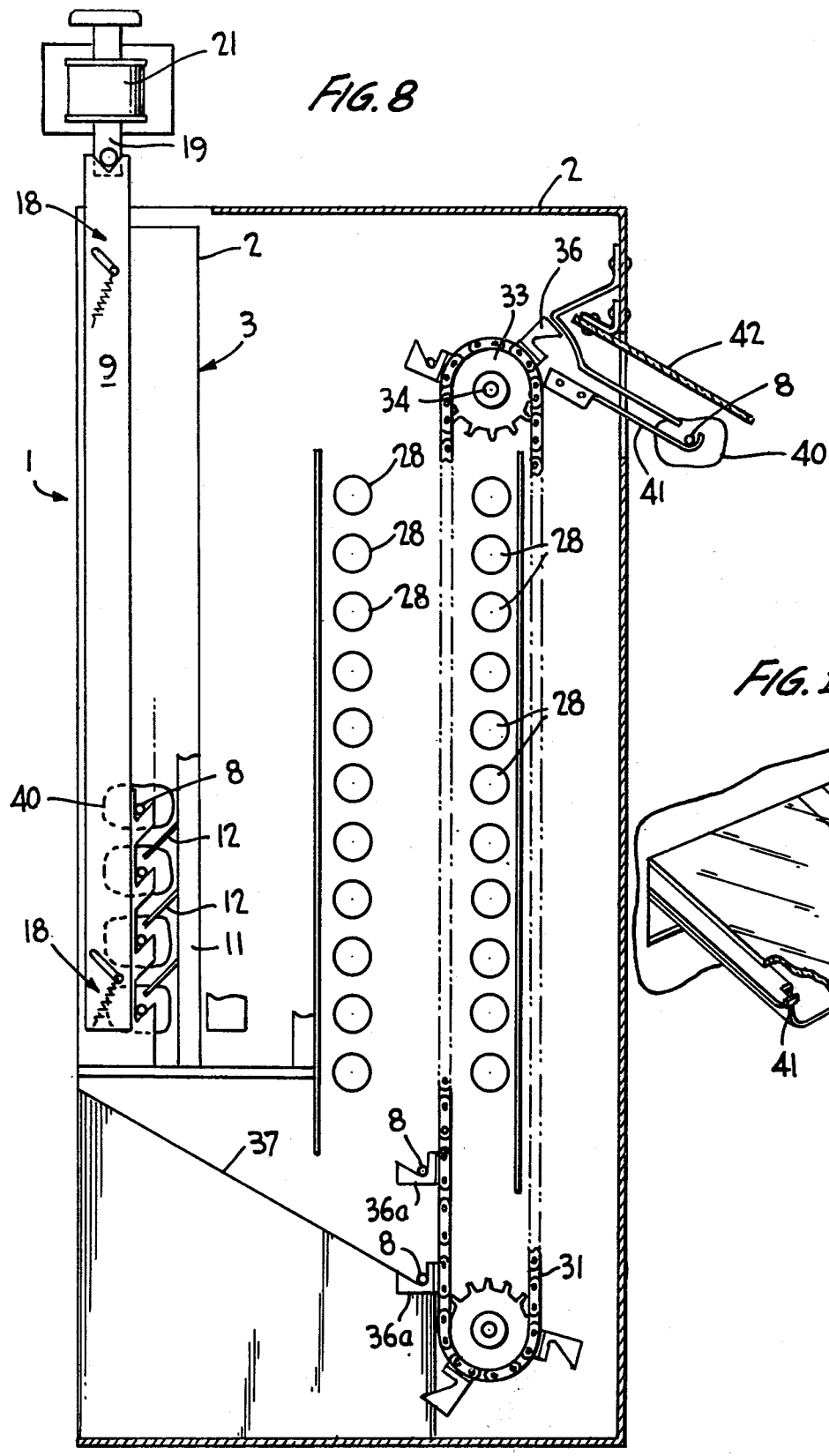
FIG. 8 is a cross-sectional side view of an alternate embodiment of the apparatus of FIG. 3.

With particular reference to FIG. 4, the dispenser of the invention, generally indicated at 1, comprises a housing 2 for a removable dispensing cartridge 3 adapted for storing and feeding the articles to be dispensed. The cartridge 3 includes a frame 4 having a first pair of vertical side members 5 including a plurality of support means comprising horizontally aligned notches 6 for supporting the articles to be dispensed in vertical relationship within the cartridge 3. In the illustrated embodiment, the articles to be dispensed comprise food items such as hot dogs 7 supported in notches 6 by skewers 8. In addition to the hot dogs 7, however, the dispenser 1 is useful for dispensing a large variety of both food and non-food items, but is particularly useful for skewered foods including those commonly served en brochette, such as kabobs.

The cartridge 3 further includes guide means for guiding the skewers 8 holding the hot dogs 7 to the next subjacent notches 6 as the skewers 8 are displaced during the dispensing process, as by a push bar 9. The guide means exemplified comprise a second pair of vertical side members 11 in the frame 4, having vertically disposed pins 12 corresponding with, and extending into the notches 6. As the push bar 9 is operated, the skewers 8 are dislodged from the notches 6 and drop on to the subjacent pins 12, which guide them into the corresponding subjacent notches 6, or, in the case of the lowermost hot dog 7a, through a discharge outlet 13 in the cartridge 3. The outlet 13 communicates with discharge means in the housing 2 comprising an opening 14 in the floor of the housing 2. The housing 2 is optionally refrigerated, and in this event, the opening 14 is provided with a door 16, and the housing 2 is insulated with insulating material 15, as best seen in FIG. 3. The cartridge 3 may be supplied for disposition in the housing 2 as a disposable filled "blister pack" as shown in FIG. 11, or may be intended for reuse, in which case means such as hinge 17 (FIG. 4) are included to permit the pairs of vertical side members 5 and 11 to be separated so that the cartridge 3 may be refilled.

The displacing means comprising push bar 9 may be associated with the cartridge 3, as shown in FIG. 4, or more preferably, associated with the housing 2. In a preferred embodiment, illustrated in detail in FIGS. 5 and 6, the push bars 9 include a pin and slot mechanism 18 for translating downward motion from associated levers 19 into horizontal motion of the push bars 9 so that the skewers 8 are displaced from the notches 6. Preferably, the levers 19 are actuated by actuating means such as lever solenoids 21 to move from the position indicated by solid lines to the position indicated by dotted lines; the levers 19 are retracted to their original position by countersprings 22. In an alternate embodiment shown in FIGS. 9 and 10, the push bars 9, guided by a pin and slot mechanism 18a, are displaced horizontally by levers 19a, preferably actuated by lever solenoids 21a. The levers 19 and 19a are either secured to the push bars 9 so that the push bars automatically return to their original positions as the levers are retracted, or the push bars 9 are biased towards the inoperative position by biasing means such as biasing spring 23 shown in FIG. 4. Both the push bars 9 and the door 16 to the discharge opening 14 in the housing 2 may be manually operated, if desired. However, for commercial vending operations, both mechanisms are preferably automatically actuated. As best shown in FIG. 3, the door 16 is conveniently operated by actuation of a linkage 24 by door solenoid 21b and closed by the action of a counterweight 26.

In a particularly contemplated embodiment of the invention, the dispenser of the invention is employed for dispensing food to be cooked, particularly skewered food. Typically, the dispenser is associated with a cooking assembly in a combined dispensing and cooking apparatus of the type illustrated in FIGS. 3 and 8, wherein skewered food discharged from the dispenser 1 through door 16 is conveyed by endless conveyor means past a series of cooking elements; the cooked food is then discharged from the apparatus. The dispenser 1 may be used in conjunction with any conventional cooking assembly. However, in a particularly preferred embodiment of the invention, the dispenser 1 is employed in conjunction with a cooking assembly including a novel endless conveyor system, which is the subject of copending U.S. patent application Ser. No. 06/380,767, filed May 21, 1982, by Boosalis, et al. With particular reference to FIG. 3, the inventive embodiment comprises a cooking assembly generally indicated at 27 disposed in a common housing 25 with dispenser 1. The cooking assembly 27 includes a vertical array of cooking elements such as infrared lamps 28 disposed in a parallel plane to the dispensing cartridge 3, and an endless conveyor system including endless conveyor means generally indicated at 29 for conveying food from the dispenser 1 past the cooking elements 28. The endless conveyor means 29 comprises two endless belts 31 of the chain link type (only one of which is shown) disposed parallel to the vertical array of cooking elements 28. Preferably, the cooking elements 28 are associated with reflecting means for reflecting heat toward the belt 31 and the food it carries, comprising a polished reflector 32 of known type. The belts 31 are driven by spaced sprocket wheels 33 supported on shafts 34 which extend between opposite side walls of the common housing 25. (Each shaft carries two sprocket wheels 33, but only one is illustrated on each shaft, exemplifying the interaction between the belts 31 and the associated sprocket wheels 33.) The sprocket wheels are in turn driven in a conventional manner as by an electric motor associated with a usual drive shaft or chain and associated gearing system (not shown). Preferably, the motor is of the variable speed type, to permit regulation of chain speed and hence cooking time. As best seen in FIGS. 3 and 7, each belt 31 includes spaced receiving means for receiving and carrying food from dispenser 1, comprising a plurality of brackets 36 extending from the face of each belt 31. Each bracket 36 is horizontally aligned with a corresponding bracket on the opposing belt (not shown) which are adapted to receive and carry the free ends of the skewers 8 piercing the food articles discharged from the dispenser 1. Each bracket is angled sufficiently to retain the skewer 8 and includes bearing means for bearing the weight of skewers 8 such as roller bearings 35 in the vertex of the angles. As best seen in FIG. 3, the common housing 25 suitably includes a ramp 37 or similar gravity conveying means for conveying the material discharged from the dispenser 1 to the receiving brackets 36 disposed on the belt 31. As best seen in FIG. 7, the endless conveyor system of the invention further includes rotating means for rotating the skewers 8 carried by the brackets 36 as the belts 31 move past the cooking elements 28. The rotating means comprises a rack gear 38 in cooperation with biasing means for biasing the belt 31 toward the rack gear 38 such as plurality of spring-biased roller arms 39 pivotally secured to a section of the housing 25. The biasing action of the roller arms 39 positively engages the skewers 8 with the rack gear 38 against the bearings 35, causing rotation of the skewer 8 and the associated food article as the endless belt 31 is driven by the sprockets 33. It is essential that the bearing means be provided for bearing the weight of the skewer 8 on the bracket 36. Without such bearing means, the skewer will not be rotated, or will be rotated only erratically, and the product will not be properly cooked.

Figure 12:
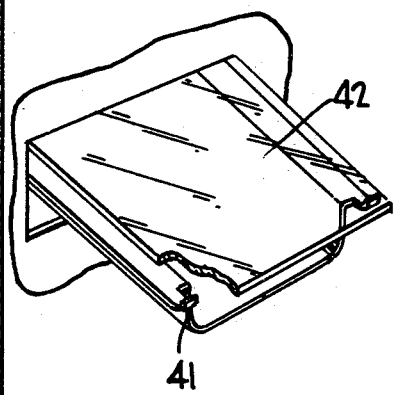
FIG. 12 is a perspective view of a detail of the apparatus of FIGS. 1, 2, 3, and 8.

As best seen in FIG. 3, as the endless belt 31 moves over the upper sprocket 33, the associated bracket 36 is inverted, and the skewered food product is dispensed through a discharge chute 41 in the common housing 25. As best seen in FIG. 12, the chute 41 is preferably equipped with a "sneeze guard" 42 for sanitary reasons.

A modification of the embodiment of FIGS. 3 and 7, particularly suitable for food items such as skewered buns 40, which do not require rotation for adequate cooking, is illustrated in FIG. 8. In this embodiment, a cooking assembly 27a includes a similar endless belt 31 driven by sprockets 33 which conveys skewered food discharged from the dispenser 1 past a double array of cooking elements 28. The cooking elements 28 are disposed in spaced vertical arrays parallel to the dispensing cartridge 3 so that dispensed food picked up by receiving brackets 36a disposed on belt 31 is carried between the two arrays of cooking elements 28. In this embodiment, no provision is made for rotation of the skewered food carried by brackets 36a, and the brackets 36a accordingly are not provided with the bearings 35 illustrated in the embodiment of FIG. 7. In the embodiment of FIG. 8, skewered food is dispensed through discharge chute 41 as previously described, on passing over the uppermost sprocket 33. In both the embodiments of FIGS. 3 and 8, a fan 43 driven by motor 45 (FIGS. 1 and 2) may be provided for the cooking assembly 27 to assist in the evacuation of vaporized water and grease particles. However, in the embodiment of FIG. 8, a fan will not be required for some cooking operations, for example, bun warming.

As best seen in FIGS. 1 and 2, the common housing 25 for the dispenser 1 and cooking assembly 27 may include either a top access 44 (FIG. 1) or side access 46 (FIG. 2) for insertion of cartridges 3. FIG. 13 is a detailed illustration of the top access apparatus of FIG. 1 associated with the actuating means of FIGS. 5 and 6. In FIGS. 1 and 2, the dispenser 1 is shown employed with both a cooking assembly 27 of FIG. 3 and a cooking assembly 27a of FIG. 8, suitable for cooking hot dogs and warming buns.

In operation, one or more filled dispensing cartridges 3 are placed in the dispenser 1. To dispense skewered hot dog 7a, the lever solenoids 21 or 21a are energized to activate the levers 19, which in turn actuate the push bars 9 to displace the skewers 8 from the notches 6 in the vertical side members 5. The pins 12 of the guide means then direct each of the skewers 8 holding hot dogs 7 to the next subjacent notches 6; the lowermost pins 12 direct the skewers 8 holding hot dog 7a through the outlet 13 in the cartridge 3 and the opening 14 in the floor of the housing 2. If the opening 14 is provided with a door 16, a door solenoid 21b is activated to open door 16 to dispense the hot dog 7a. If a dispenser 1 is employed with a cooking assembly 27, the skewered hot dog 7a proceeds down ramp 37 to the endless conveyor means 29, where the skewers 8 are picked up by a pair of brackets 36 on endless belts 31. As the belts 31 are driven by the sprockets 33, the skewers 8 are positively engaged between the bearings 35 on the brackets 36 and the rack gear 38 by the action of the roller arms 39 urging the belts 31 toward the rack gear 38, and are caused to rotate as the hot dog 7a passes the cooking elements 28. As the belts 31 travel over uppermost sprockets 33, the brackets 36 are inverted, and the cooked hot dog 7a is discharged onto discharge chute 41 and dispensed.

| Numeral | Element |
| --- | --- |
| 1 | dispenser |
| 2 | housing for dispenser |
| 3 | dispensing cartridge |
| 4 | frame |
| 5 | first pair of vertical side members of frame |
| 6 | notches |
| 7 | hot dogs |
| 8 | skewers |
| 9 | push bar |
| 10 | |
| 11 | second pair of vertical side members of frame |
| 12 | pins |
| 13 | outlet of cartridge 3 |
| 14 | opening in housing 2 |
| 15 | insulating material |
| 16 | door in housing 2 |
| 17 | hinge |
| 18 | pin and slot mechanism |
| 19 | levers |
| 20 | |
| 21 | solenoids |
| 22 | countersprings |
| 23 | spring bias |
| 24 | linkage |
| 25 | common housing |
| 26 | counterweight |
| 27 | cooking assembly |
| 28 | cooking elements - infrared lamps |
| 29 | endless conveyor means |
| 30 | |
| 31 | endless belt |
| 32 | reflector |
| 33 | sprocket wheels |

-continued

| Numeral | Element |
| --- | --- |
| 34 | shafts for sprocket wheels |
| 35 | bearings |
| 36 | brackets |
| 37 | ramp |
| 38 | rack gear |
| 39 | spring-biased roller arms |
| 40 | skewered buns |
| 41 | discharge chute |
| 42 | sneeze guard |
| 43 | fan |
| 44 | top access to common housing 25 |
| 45 | motor for fan 43 |
| 46 | side access to common housing 25 |

What is claimed is:

1. Dispensing apparatus for sequentially dispensing a plurality of articles comprising:
  (a) a housing including discharge means for discharging said articles;
  (b) at least one dispensing cartridge removably disposed within said housing adapted for storing said articles in superposed relationship with respect to one another, said cartridge including
    (i) a frame having a pair of vertical side members;
    (ii) a plurality of support means associated with said side members for supporting said articles in superposed relationship with respect to one another within said cartridge; and
    (iii) guide means associated with said support means for guiding an article displaced from one support means to the next subjacent support means or from the last support means to the discharge means; and
  (c) displacing means operatively associated with said dispensing cartridge for displacing said articles from said support means.

2. The invention of claim 1, further including actuating means for actuating said displacing means to displace said articles from said support means so that each article is guided to the next subjacent support means or to the discharge means.

3. The invention of claim 1, wherein said support means comprises a plurality of horizontally aligned corresponding notches on said pair of vertical side members.

4. The invention of claim 3, wherein said guide means comprises a pin extending into each notch.

5. The invention of claim 3, wherein the article to be dispensed is a skewered food item, and the free ends of each skewer are disposed in said corresponding notches.

6. The invention of claim 5, wherein said displacing means comprises a pair of vertical bars operable to displace said skewer ends from said notches.

7. In a combined dispensing and cooking apparatus of the type wherein food to be cooked is dispensed from a storage dispenser onto endless conveyor means for conveying the food past a series of cooking elements, the improvement comprising employing the dispensing apparatus of claim 5 as said storage dispenser.

8. A dispensing cartridge for use in conjunction with dispensing means for sequentially dispensing a plurality of articles comprising:
  (a) a frame including a pair of vertical side members;

(b) a plurality of vertically disposed support means associated with said side members for supporting said articles in superposed relationship with respect to one another within said cartridge; and
(c) guide means associated with said support means for guiding an article displaced from one support means to the next subjacent support means;

wherein said support means comprises a plurality of horizontally aligned corresponding notches on said pair of vertical side members.

9. The invention of claims 3 or 8, wherein said guide means comprises a plurality of pins vertically disposed on a second pair of vertical side members for said frame, each of said pins corresponding with and extending into one of said notches.

10. The invention of claim 8, wherein the article to be dispensed is a skewered food item, and the free ends of each skewer are disposed in said corresponding notches.

11. The invention of claim 8, wherein said cartridge includes a plurality of skewered foodstuffs disposed on said support means, and further comprising:

selectively actuable displacing means operatively associated with said cartridge for displacing said skewered foodstuffs from said support means, said displacing means comprising at least one vertically-extending member mounted for selective horizontally-directed displacement to push said skewered foodstuffs out of said notches.

* * * * *